United States Patent
Gupta et al.

(10) Patent No.: US 6,691,124 B2
(45) Date of Patent: Feb. 10, 2004

(54) COMPACT DATA STRUCTURES FOR PIPELINED MESSAGE FORWARDING LOOKUPS

(75) Inventors: Pankaj Gupta, Mountain View, CA (US); Srinivasan Venkatachary, Sunnyvale, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 374 days.

(21) Appl. No.: 09/826,556

(22) Filed: Apr. 4, 2001

(65) Prior Publication Data

US 2002/0147721 A1 Oct. 10, 2002

(51) Int. Cl.$^7$ ............................................. G06F 17/30
(52) U.S. Cl. ....................... 707/101; 707/100; 707/102; 707/6
(58) Field of Search ................ 707/100, 6, 3, 707/101, 104, 8, 102; 714/38

(56) References Cited

U.S. PATENT DOCUMENTS

| | | | | |
|---|---|---|---|---|
| 5,414,836 A | * | 5/1995 | Baer et al. ..................... | 714/38 |
| 6,018,741 A | * | 1/2000 | Howland et al. ........... | 707/102 |
| 6,029,170 A | * | 2/2000 | Garger et al. ................ | 707/100 |
| 6,052,693 A | * | 4/2000 | Smith et al. ............. | 707/104.1 |
| 6,209,020 B1 | | 3/2001 | Angle et al. | |
| 6,343,072 B1 | | 1/2002 | Bechtolsheim et al. | |
| 6,523,042 B2 | * | 2/2003 | Milleker et al. ............ | 707/102 |
| 6,546,391 B1 | * | 4/2003 | Tsuruoka ....................... | 707/8 |
| 2002/0009076 A1 | * | 1/2002 | Engbersen et al. ......... | 370/389 |
| 2002/0107860 A1 | * | 8/2002 | Gobeille et al. ............ | 707/101 |
| 2002/0147721 A1 | * | 10/2002 | Gupta et al. ................ | 707/100 |
| 2002/0184231 A1 | * | 12/2002 | Baskins et al. ............. | 707/102 |
| 2002/0194184 A1 | * | 12/2002 | Baskins et al. ............. | 707/100 |

* cited by examiner

*Primary Examiner*—Jean M. Corrielus
(74) *Attorney, Agent, or Firm*—Kevin L. Daffer; Conley Rose P.C.

(57) ABSTRACT

The invention provides a method and system for lookup (such as for example, lookup of message header information) that records information in a relatively large database in a relatively compact structure, while still providing for relatively rapid lookup and update. A relatively large but compact database includes a hybrid tree (or hybrid trie) structure, whereby information in denser portions of the database can be stored and retrieved from an identifiable leaf in the hybrid trie. The hybrid trie includes at least one leaf node marked to include a different data structure, whereby information in sparser portions of the database can be stored and retrieved from a more densely packed table. In a preferred embodiment, each hybrid trie node is marked as one of: a branch node, a leaf node, or a search node; each search node includes information for a sparser portion of the hybrid trie, packed into a structure capable of linear search in response to a set of packet header information (such as a destination IP address).

22 Claims, 4 Drawing Sheets

COMPACT DATA STRUCTURES FOR PIPELINED MESSAGE FORWARDING LOOKUPS

BACKGROUND OF THE INVENTION

1. Field of the Invention

This invention relates to compact data structures, such as for example those used for message forwarding.

2. Related Art

In forwarding messages in a computer network, it is desirable to match lookup search keys (including header information from packets in which those messages are embodied) with routing information indicating how to process those packets and message. It is particularly desirable that the matching operation be performed as rapidly as possible. This has led to a desire for data structures for storing and retrieving information regarding those lookup search keys, so that data elements associated with those lookup search keys can be rapidly stored and retrieved.

In known methods for storage and retrieval of information regarding lookup search keys, the data structures used are relatively large. Thus, the data structures are often stored in a relatively slow and expensive memory (such as an off-chip memory for a routing circuit integrated onto a single chip), thus slowing each access to the data structures themselves, and providing a limit to accesses due to the nature of the off-chip memory.

Accordingly it would be desirable to have a technique for storing and retrieving information associated with lookup search keys that is simultaneously relatively fast and inexpensive, while allowing for relatively large amounts of data, and is not subject to the drawbacks of the known art. The following features would be advantageous:

- It would be advantageous if that technique has all of the features of including a relatively compact data structure, one that is easy to read from (that is, to perform lookup operations), and easy to write to (that is, to perform update operations).
- It would be advantageous if that technique were not specific to any particular application, any particular format or size of lookup search keys and associated data.
- It would be advantageous if that technique were able to include multiple matching data elements for any selected lookup search key, where those multiple matching data elements can be ordered with regard to their priority. This is particularly advantageous with regard to the "longest prefix match" problem, as further described in the incorporated disclosure (described below).
- It would be advantageous if that technique were well adapted to pipelined operation, such as further described in the incorporated disclosure.

These advantages and others are provided in an embodiment of the invention, described herein, including a hybrid trie data structure in which distinct types of nodes (such as a search node or a branch/search node, as described below) are substituted for sub-tries in response to a number of prefixes in those sub-tries.

SUMMARY OF THE INVENTION

The invention provides a method and system for lookup (such as for example, lookup of message header information) that records information in a relatively large database in a relatively compact structure, while still providing for relatively rapid lookup and update.

In a first aspect of the invention, a relatively large but compact database includes a hybrid tree (or hybrid trie) structure, whereby information in denser portions of the database can be stored and retrieved from an identifiable leaf in the hybrid trie. The hybrid trie includes at least one leaf-search node marked to include a different data structure, whereby information in sparser portions of the database can be stored and retrieved from a more densely packed table. In a preferred embodiment, each hybrid trie node is marked as one of: a branch node, a leaf-search node, or a branch-search node; each search node includes information for a sparser portion of the hybrid trie, packed into a structure capable of linear search in response to a set of packet header information (such as a destination IP address).

In a second aspect of the invention, the hybrid trie is recorded in a sequence of SRAM memories, disposed so that each stride of the hybrid trie includes a lookup within a single memory, whereby a corresponding sequence of lookup requests can be processed in a pipelined manner with all the memories performing concurrent lookups, whereby complete lookups can be performed at a rate substantially equal to their arrival rate (even though each lookup takes a sequence of memory references to complete). Each branch node and each leaf node is recorded in a single memory. Each search node can be striped across a plurality of memories, whereby search of a search node can be distributed across those memories, and completion of lookups involving a search node operates within the pipeline paradigm of completion of lookups involving only reference to branch nodes and leaf nodes.

The invention has general applicability to compact memory storage and retrieval, to update of information recorded in relatively compact form, and to applications having utility for data lookup. None of these applications are limited specifically to lookup for message header information, nor are they necessarily related to the specific applications disclosed herein. For example, embodiments of the invention can include one or more of, or some combination of, the following applications:

- Routers and switches at all levels of the ISO/OSI networking model, including without limitation: bridges, network gateways, network routers and switches;
- Data storage and retrieval for arbitrary data in a relatively large database.

DESCRIPTION OF THE PREFERRED EMBODIMENT

The invention is described herein with regard to preferred steps and data structures. Those skilled in the art will recognize, after perusal of this application, that the described steps and data structures are not limited to any particular circuits. Rather, those of ordinary skill in the art would be able to implement the described steps and data structures, and equivalents thereof, without undue experimentation or further invention. All such implementations are within the scope and spirit of the invention.

Related Applications

Inventions described herein can be used in conjunction with inventions described in the following documents:

U.S. patent application Ser. No. 09/827,270, tilted "High-Speed Message Forwarding Lookups for Arbitrary Length Strings Using Pipelined Memories" by Gunta et al. filed even date herewith.

This document is hereby incorporated by reference as if fully set forth herein. This document is referred to as the incorporated disclosure.

Lexicography

The following terms refer or relate to aspects of the invention as described below. The descriptions of general meanings of these terms are not intended to be limiting, only illustrative.

router—in general, any device for performing lookup of message header information against a information database, and for treating messages having that message header information differentially in response to a result of the lookup. For example, a router can act in response to destination IP addresses (for forwarding), in response to destination IP addresses and source IP addresses (for multicast forwarding and for access control), or in response to port number or protocol type (for enforcing administrative restrictions or other message routing rules).

stripe—in general, a set of memory locations in a sequence of memories, disposed so that once the location of the stripe is known, searching in subsequent memories does not require any further pointers to successive parts of the stripe. In a preferred embodiment, each stripe includes the same memory location offsets from the beginning of each memory in sequence after the beginning of the stripe. In a preferred embodiment, each prefix is striped across a leaf-search node that is itself striped.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art without further invention or undue experimentation.

Hybrid Trie Structure

Figure 1:
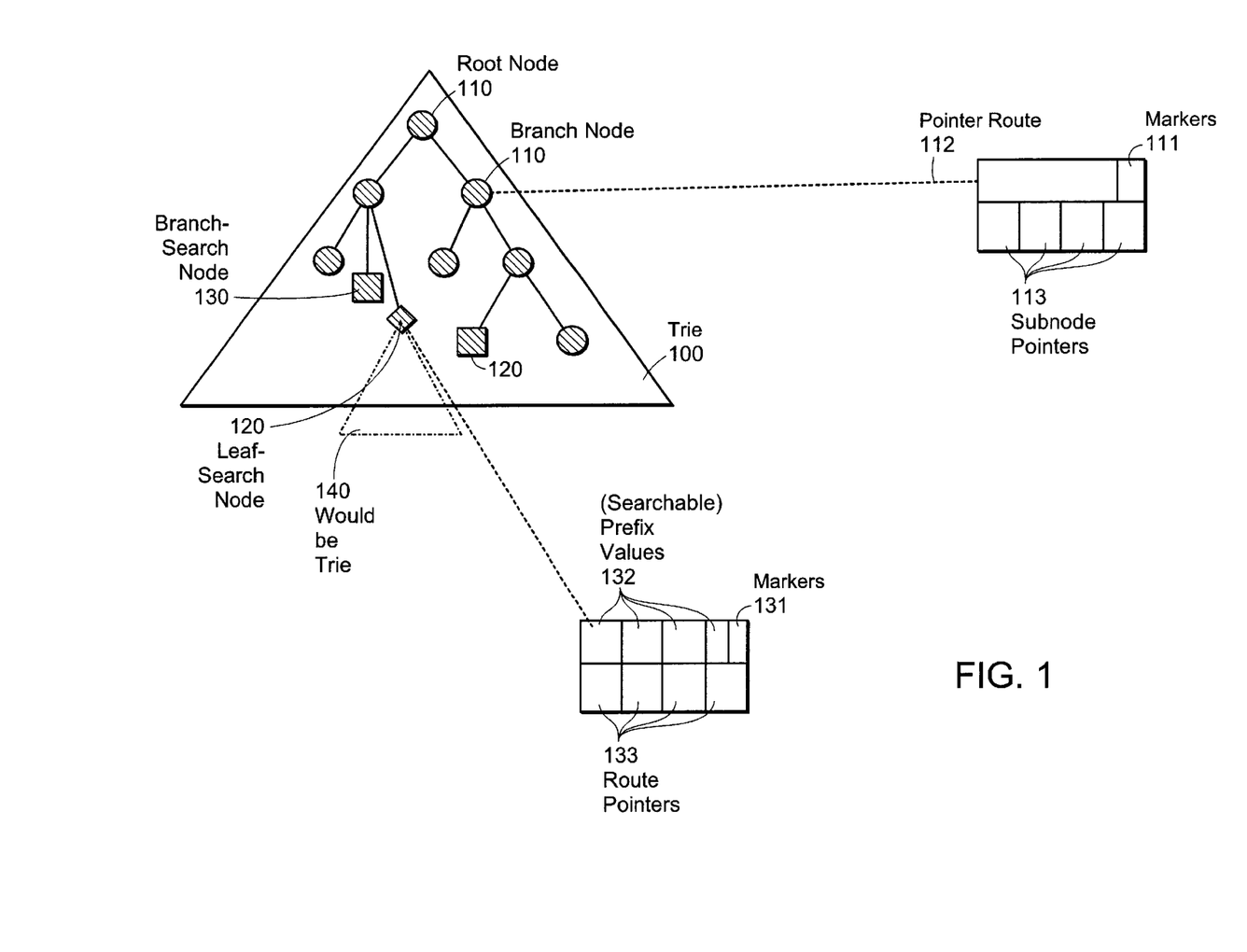
FIG. 1 shows a data structure diagram of a hybrid trie structure including search nodes.

FIG. 1 shows a data structure diagram of a hybrid trie structure including search nodes.

A data structure includes a hybrid trie 100, having a set of branch nodes 110 and a set of leaf-search nodes 120, and a set of branch-search nodes 130. One of the branch nodes 110, at the root of the trie 100, is the root node.

As described herein, each branch node 110 defines a sub-trie that depends from that branch node 110. Each leaf-search node 120 (and each branch-search node 130) defines a set of individual data elements, such as route pointers. In a preferred embodiment, each leaf-search node 120 is used to substitute for a sub-trie including a plurality of branch nodes 110 (or branch-search nodes 130), where the sub-trie has fewer than a threshold value T individual data elements.

In alternative embodiments, selection of which type of node to use at any selected point in the hybrid trie 110 can be responsive to factors other than comparing the number of data elements against a threshold value T, or can be responsive to factors other than the number of data elements. The hybrid trie 110 with multiple types of nodes has the advantage that different types of nodes can be used when the nature of the stored data makes it advantageous to store that data in different formats. While in a preferred embodiment, leaf-search nodes 120 and branch-search nodes 130 use linear search to match prefix values against lookup search keys, in alternative embodiments, leaf-search nodes 120 and branch-search nodes 130 may use other types of search (such as for example a balanced binary tree or a hash table), or there may be multiple subtypes of leaf-search nodes 120 and branch-search nodes 130, each using a distinct type of search adapted to its contents.

Each branch node 110 includes a marker 111 indicating that the node is a branch node 110, and a set of subnode pointers 113. The subnode pointers 113 point to locations for each of the sub-tries depending from that branch node 110 that depend from that particular branch node 110.

Each leaf-search node 120 includes a marker 131 similar to a branch node 110, instead indicating that the node is a leaf-search node 120. Each leaf-search node 120 terminates the path down the trie 100 and includes a set of prefix values against which a lookup search key can be matched. Each leaf-search node 120 associates each of its prefix values with a specific data element 122. In a preferred embodiment, the data element 122 includes a route pointer; this allows the hybrid trie 100 to be used for lookup or update of a route pointer in response to a lookup search key.

Although a preferred embodiment includes information regarding routing packets, there is no particular requirement for the invention not to include other or different information. Thus, references in this application to the marker 111 should be read generally to indicate any marker suitable for determining what type of node is present, and references in this application to a route pointer should be read generally to indicate any data suitable for a lookup or update operation.

Each branch-search node 130 includes a marker 131 similar to a branch node 110 or a leaf-search node 120, indicating that the node is a branch-search node 130. Each branch-search node 130 has the functionality of a branch node 110 and a leaf-search node 120 at the same time. Thus, a branch-search node 130 can be used for further traversing of the hybrid trie 100, and can also be used to match a lookup search key against one of a set of prefix values.

Memory Structure Diagram

Figure 2:
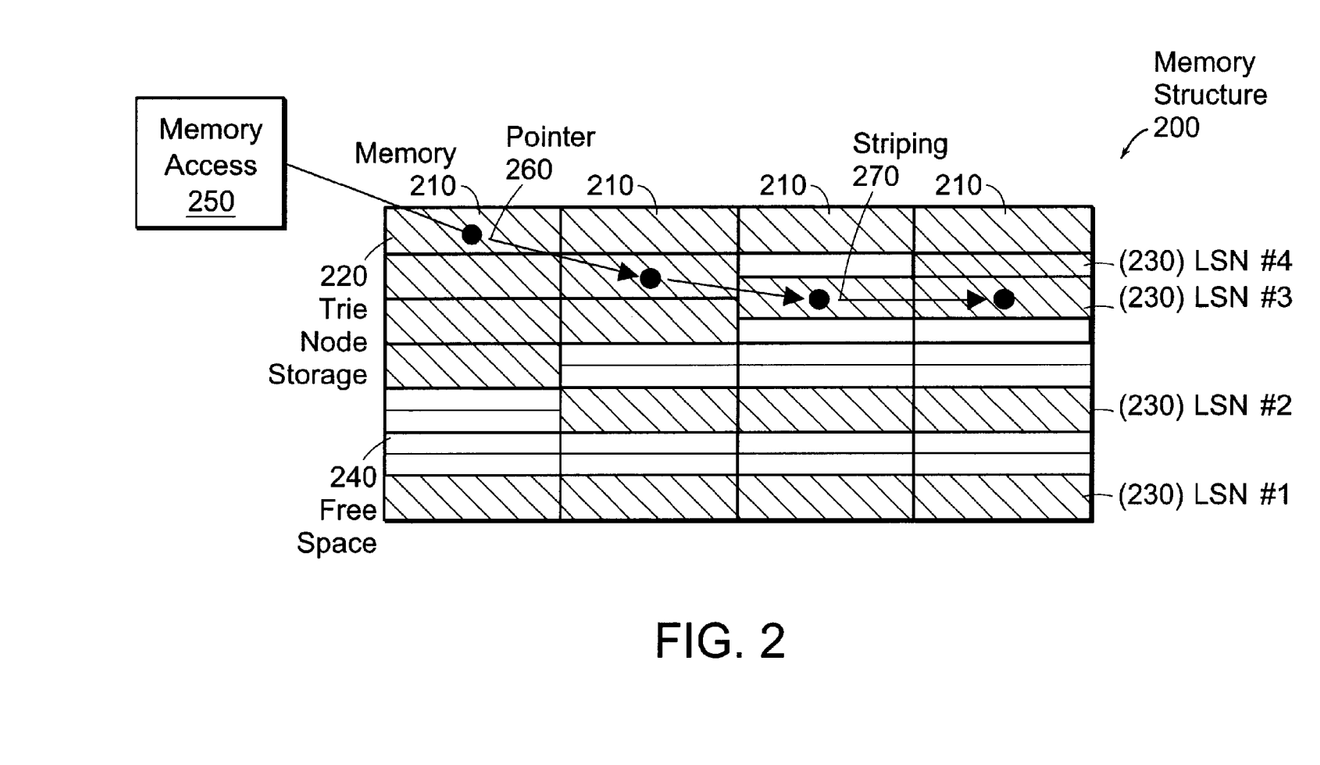
FIG. 2 shows a memory structure diagram of a hybrid trie structure.

FIG. 2 shows a memory structure diagram of a hybrid trie structure.

A memory structure 200 includes a sequence of memories 210, each of which includes a set of memory registers 211, each capable of storing at least a portion of a branch node 110, a leaf-search node 120, or a branch-search node 130.

Each memory 210 includes a dynamically allocated portion allocated for trie storage 220, including branch nodes 110 and branch-search nodes 130, and a dynamically allocated portion allocated for search storage 230, including leaf-search nodes 120, and a dynamic portion not allocated and therefore free space 240.

When performing a lookup or update, each memory 210 participates in one memory access 250 (represented in the figure to indicate that a particular memory register 211 is accessed). In a preferred embodiment, as further described in the incorporated disclosure, the memory accesses 250 to all memories 210 are performed substantially concurrently, therefore performing multiple memory accesses 250 per clock cycle, so as to process multiple lookup operations or update operations in a pipelined manner. In a preferred embodiment, further described in the incorporated disclosure, this allows the memory structure 200 to perform one lookup operation or update operation for each clock cycle.

If the part of the lookup operation or update operation is for a branch node 110 or a branch-search node 130, the memory access 250 provides a branch pointer 260 to a location in the next memory 210. Thus, successive memory accesses 250 walk down the trie 100 until reaching a branch-search node 130 having a match to the lookup search key, and continues onward to find a longest prefix match.

If the part of the lookup operation or update operation is for a leaf-search node 120, the memory access 250 provides either a data element 133 associated with a (searchable) lookup search key 132 found in the leaf-search node 120, or an indicator to continue searching the leaf-search node 120 in the next memory 210. Thus, successive memory accesses 250 to a leaf-search node 120 can trace across a stripe in which the leaf-search node 120 is stored in the memory structure 200. As shown in the figure, a leaf-search node 120 can trace across a stripe including one or more memories 210.

When a leaf-search node 120 is striped across more than one memory 210 (and thus across more than one pipeline stage), each prefix value in that leaf-search node 120 can also be striped across the memories 210 maintaining the leaf-search node 120. This allows each reference to the leaf-search node 120 to provide for comparison against a portion of the prefix value, in accordance with pipelined access to the memories 210. Each prefix value can be striped across some of, or all of, the memories 210 the leaf-search node 120 is striped across.

Method of Use (Lookup)

Figure 3:
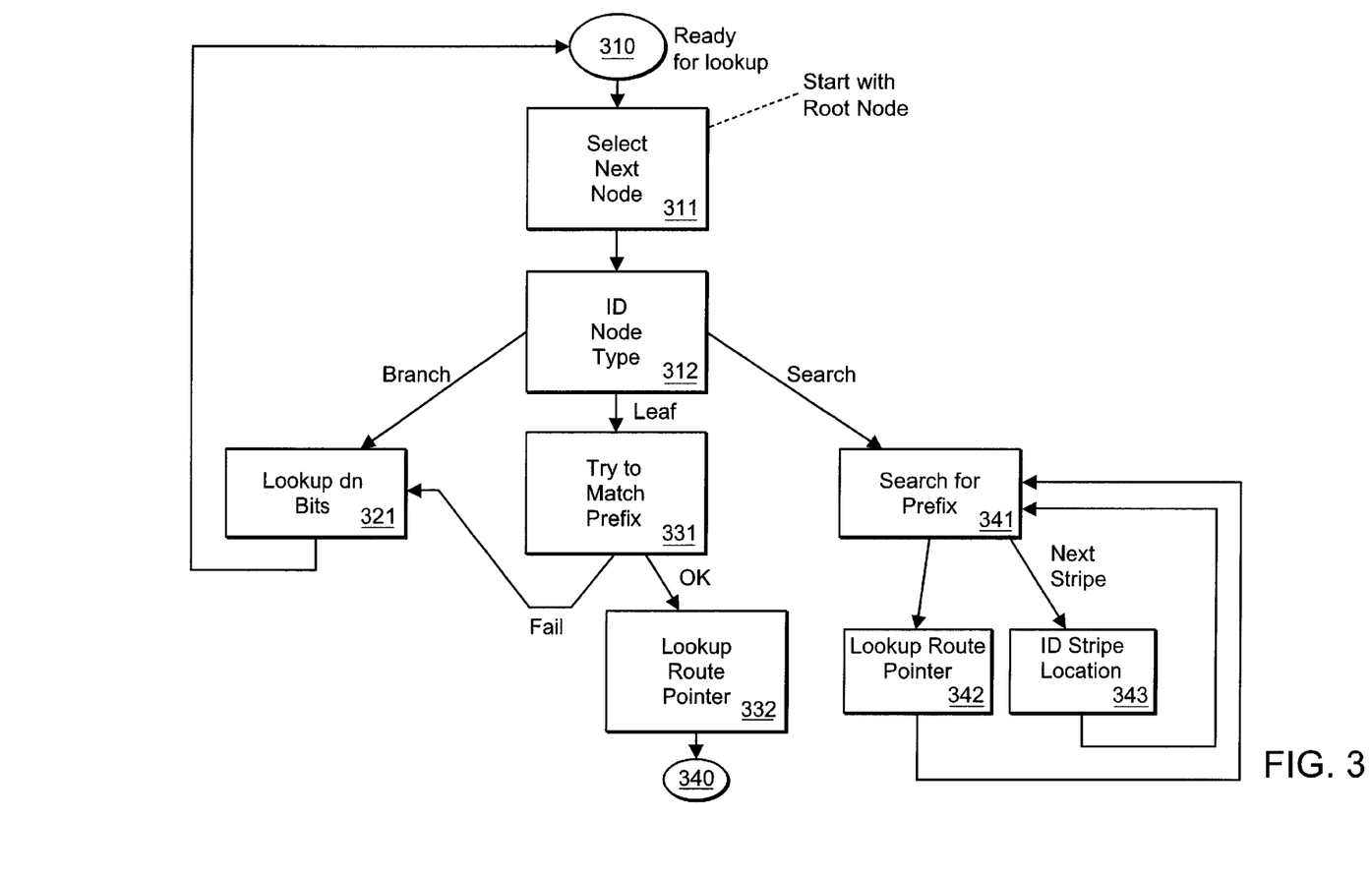
FIG. 3 shows a process flow diagram of a data lookup method.

FIG. 3 shows a process flow diagram of a data lookup method.

A method 300 includes a set of flow points and process steps as described herein.

Although by the nature of textual description, the flow points and process steps are described sequentially, there is no particular requirement that the flow points or process steps must be sequential. Rather, in preferred embodiments of the invention, the described flow points and process steps are performed in a parallel or pipelined manner.

At a flow point 310, the method 300 is ready to perform a lookup operation.

At a step 311, the method 300 selects a next node for the lookup operation. In a preferred embodiment, the "next node" at the start of the method 300 is the branch node 110 at the root of the trie 100 (that is, the root node).

At a step 312, the method 300 determines the type for the node, thus, a branch node 110, a leaf-search node 120, or a branch-search node 130. If the node is a branch node 110, the method 300 proceeds with the step 321. If the node is a leaf-search node 120, the method 300 proceeds with the step 322. If the node is a branch-search node 130, the method 300 proceeds with the step 323.

At a step 321, the method 300 performs a lookup with regard to dn bits, where dn is a parameter specific to the depth within the trie 100 at which the branch node 110 is found. This is further described in the incorporated disclosure. In response to a result of the lookup, the method 300 determines a next node for lookup in the next memory 210. The method 300 proceeds with the step 311.

At a step 331, the method 300 attempts to match the lookup search key associated with the branch-search node 130. If the match fails, the method 300 proceeds with the step 321 to continue to walk down the trie 100 for the lookup search key. If the match succeeds, the method 300 records the successful match, and proceeds with the step 332.

At a step 332, the method 300 has found a first data element associated with the lookup search key. The lookup operation proceeds further to attempt to find a longest prefix match, that is, a data element associated with a longer prefix of the lookup search key. The method 300 therefore proceeds with the step 321, until the lookup search key is exhausted and there are no further bits for lookup, or there are no further data entries for the lookup operation to review (that is, there are no further nodes below the node being looked at). When the lookup search key is exhausted, the method 300 proceeds with the flow point 350.

At a step 341, the method 300 searches the leaf-search node 120, using the lookup search key, for the longest prefix match. If the lookup search key is found, the method 300 proceeds with the step 342. If the lookup search key is not found, the method 300 proceeds with the step 343.

At a step 342, the method 300 has found a data element associated with the lookup search key in a leaf-search node 120. If the leaf-search node 120 has been completely searched, the method 300 has found the longest prefix match, and proceeds with the flow point 350. If the leaf-search node 120 has not been completely searched, the method 300 continues with the step 343 to possibly find a longer prefix match.

At a step 343, the method 300 determines the location of a remaining portion of the leaf-search node 120 (thus, for a striped leaf-search node 120) in the next memory 210, and the method proceeds with the step 341.

At a flow point 350, the lookup operation is substantially complete. The method 300 performs a plurality of lookup operations in a sequence in which they are presented, substantially concurrently in a pipelined manner, as further described in the incorporated disclosure.

Method of Use (Update)

Figure 4:
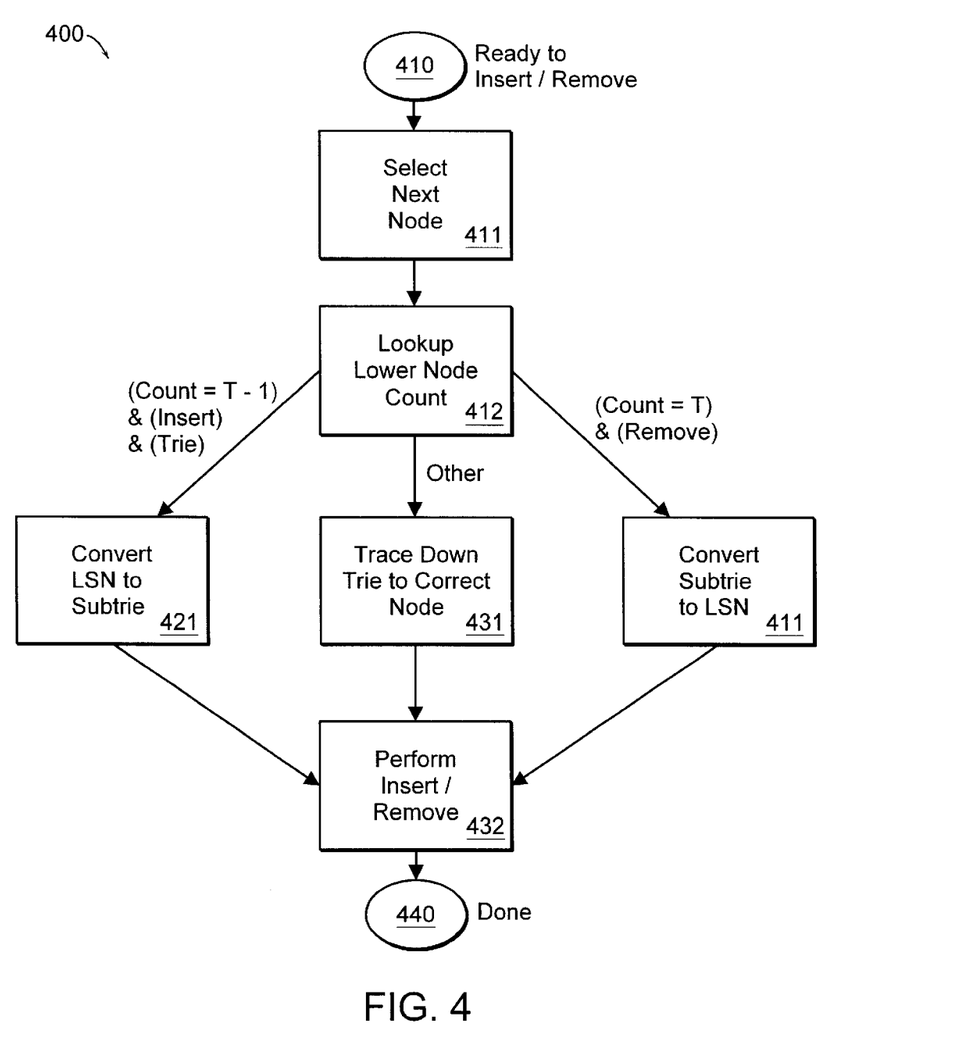
FIG. 4 shows a process flow diagram of a data update method.

FIG. 4 shows a process flow diagram of a data update method.

Although by the nature of textual description, the flow points and process steps are described sequentially, there is no particular requirement that the flow points or process steps must be sequential. Rather, in preferred embodiments of the invention, the described flow points and process steps are performed in a parallel or pipelined manner.

At a flow point 410, the method 400 is ready to perform an update operation.

At a step 411, the method 400 selects a next node for the update operation. In a preferred embodiment, the "next node" at the start of the method 400 is the branch node 110 at the root of the trie 100 (that is, the root node).

At a step 412, the method 400 determines a count of data elements in the sub-trie depending from the node found in the step 411. In a preferred embodiment, this count can be stored in the node itself, or in a data structure associated with the node, or otherwise.

As part of this step, the method 400 updates the count, preferably stored in the node or an associated data structure.

As part of this step, the method 400 performs the following comparisons:

The method 400 compares the count with a threshold T.

The method 400 determines the type of update operation; that is, the method 400 determines if the update operation includes a node insertion or a node removal. The update operation might instead include only a change to data in a node, in which case it involves neither a node insertion nor a node removal.

The method 400 determines if the node itself includes a sub-trie; that is, the node is a branch node 110 or a branch-search node 130 and therefore does, or the node is a leaf-search node 120 and therefore does not.

In response to these comparisons, and as part of this step, the method 400 determines which of the following conditions apply:

The count=(T−1), the update involves a node insertion, and the node is a leaf-search node 120. If so, the method 400 proceeds with the step 421.

The count=T, the update involves a node removal, and the node is a branch node 110 or a branch-search node 130. If so, the method 400 proceeds with the step 411.

Neither of the former two conditions applies. If so, the method 400 proceeds with the step 431.

At a step 411, the method 400 converts the sub-trie depending from the branch node 110 or the branch-search node 130 into a leaf-search node 120, and performs the update with regard to the new leaf-search node 120. The method 400 proceeds with the flow point 440.

At a step 421, the method 400 converts the leaf-search node 120 into a sub-trie including one or more branch nodes 110 or branch-search nodes 130, and performs the update with regard to the new sub-trie. The method 400 proceeds with the flow point 440.

At a step 431, the method 400 walks down the trie to a branch node 110 or leaf-search node 120 associated with the update, and performs the update with regard to that associated node. The method 400 proceeds with the flow point 440.

At a flow point 440, the update operation is substantially complete. The method 400 performs a plurality of update operations in a sequence in which they are presented, substantially concurrently in a pipelined manner, as further described in the incorporated disclosure.

Generality of the Invention

The invention has general applicability to compact memory storage and retrieval, to update of information recorded in relatively compact form, and to applications having utility for data lookup. None of these applications are limited specifically to lookup for message header information, nor are they necessarily related to the specific applications disclosed herein. For example, embodiments of the invention can include one or more of, or some combination of, the following applications:

Routers and switches at all levels of the ISO/OSI networking model, including without limitation: bridges, network gateways, network routers and switches;

Data storage and retrieval for arbitrary data in a relatively large but compact database.

Other and further applications of the invention in its most general form would be clear to those skilled in the art after perusal of this application. The invention would be usable for such other and further applications without undue experimentation or further invention.

Although preferred embodiments are disclosed herein, many variations are possible which remain within the concept, scope and spirit of the invention; these variations would be clear to those skilled in the art after perusal of this application.

What is claimed is:

1. Memory or mass storage having a stored data structure, said data structure including a hybrid trie structure having
    one or more nodes of a first type, each said first type node being referenced by a branch of said hybrid trie in response to at least a portion of said lookup value; and
    one or more nodes of a second type, each said second type node including a plurality of entries responsive to corresponding lookup values, said plurality of entries being searchable using a technique other than reference through a trie structure;
    wherein for each node, selection of said first or second type is responsive to a feature of a set of data to be maintained in said hybrid trie structure, so as to optimize at least one factor associated with operations with respect to said hybrid trie structure, wherein said feature of said set of data includes a comparison with a threshold value of a number of entries in said set of data dependent from said node being selected for said first or second type, and at least one said associated factor includes an amount of memory used by said hybrid trie structure.

2. Memory or mass storage as in claim 1, wherein each one of said plurality of entries includes either
    a branch to another node of said hybrid trie structure; or
    a data value associated with said one entry.

3. Memory or mass storage as in claim 1, wherein
    said branch of said hybrid trie is included in a branch node; and
    each said branch node is stored in a memory and requires only a single memory operation in response to said lookup value to select one of said branch pointers.

4. Memory or mass storage as in claim 1, wherein
    said branch of said hybrid trie is included in a branch node; and
    each said branch node includes a plurality of entries responsive to corresponding lookup values.

5. Memory or mass storage as in claim 4, each said branch node is stored in a memory and requires only a single memory operation in response to said lookup value to both (a) select one of said branch pointers and (b) select one of said plurality of entries responsive to corresponding lookup value.

6. Memory or mass storage as in claim 1, wherein said hybrid trie includes at least a first type branch node and a second type branch node, said second type branch node having a plurality of entries corresponding to distinct lookup values associated therewith.

7. Memory or mass storage having a stored data structure, said data structure including
    at least one branch node, said branch node including one or more branch pointers referring to dependent nodes, each said branch pointer being selectable in response to at least a portion of a lookup value; and
    one or more branch pointers associated with said branch node referring to either a branch-search node or a leaf-branch node responsive to a feature of a set of data to be maintained in said hybrid trie structure, so as to optimize at least one factor associated with operations with respect to said hybrid trie structure, wherein said feature of said set of data includes a comparison with a threshold value of a number of entries in said set of data dependent from said node being selected for said first or second type, and at least one said associated factor includes an amount of memory used by said hybrid trie structure, said branch-search node or leaf-search node having a plurality of entries responsive to corresponding lookup values, said plurality of entries being disposed in a data structure other than a tree.

8. Memory or mass storage as in claim 7, including at least one branch-search node, wherein said branch-search node includes plurality of entries, each one of said entries including either a branch to another node of said hybrid trie structure, or a data value associated with said one entry.

9. Memory or mass storage as in claim 7, wherein each said branch node is stored in a memory and requires only a single memory operation in response to said lookup value to select one of said branch pointers.

10. Memory or mass storage as in claim 7, wherein each said branch node includes a plurality of entries responsive to corresponding lookup values.

11. Memory or mass storage as in claim 10, wherein each said branch node is stored in a memory and requires only a single memory operation in response to said lookup value to both (a) select one of said branch pointers and (b) select one of said plurality of entries responsive to corresponding lookup value.

12. Memory or mass storage as in claim 7, wherein said hybrid trie includes at least a first type branch node and a second type branch node, said second type branch node having a plurality of entries corresponding to distinct lookup values associated therewith.

13. Memory or mass storage having a stored data structure, said data structure including
 a sequence of memory regions, a first said memory region including one or more branch pointers stored in locations responsive to at least a portion of a lookup value, each said branch pointer referring to a location in a next said memory region; and
 at least one branch pointer referring to a leaf-search node, said leaf-search node having a plurality of entries responsive to corresponding lookup values, said leaf-search node having a plurality of parts, said plurality of parts being stored in a subsequence of said sequence of memory regions, said subsequence including at least two said memory regions after said branch pointer in said sequence.

14. Memory or mass storage as in claim 13, wherein at least one prefix value in said leaf-search node is striped across a plurality of said memory regions.

15. A method including
 performing a lookup in a first memory region in a sequence of memory regions, said lookup being in response to at least a portion of a lookup value, said lookup providing a reference to a dependent node in a tree structure, said dependent node having one of a plurality of types and being stored in a different memory region in said sequence; and
 if said dependent node includes a leaf-search node, retrieving one of a plurality of entries stored at said leaf-search node in response to said lookup value, said leaf-search node having a plurality of parts, each said part being stored in a distinct one of said sequence of memory regions.

16. A method as in claim 15, wherein said different memory region is a next one in said sequence.

17. A method as in claim 15, wherein said different memory region is an earlier one in said sequence.

18. A method as in claim 15, wherein said distinct ones of said memory regions form a subsequence of said sequence.

19. A method as in claim 15, wherein said distinct ones of said memory regions form an unbroken subsequence of said sequence.

20. A method including
 adding a new entry to a hybrid trie structure having at least a first type node and a second type node, wherein said first type node includes one entry and said second type node includes a plurality of said entries;
 converting a subtrie of said hybrid trie structure into at least one said second type node in response to a number of entries dependent from a branch node in said hybrid trie structure, wherein said new entry is dependent from said branch node;
 converting a subtrie of said hybrid trie structure into at least one branch node and at least one additional node, in response to a number of entries in said second type node, whereby said number of entries in said second type node is limited to a number readable in a single memory operation, wherein said hybrid trie includes at least a first type branch node and a second type branch, said second type branch node having a plurality of entries corresponding to distinct lookup values associated therewith; and
 said at least one branch node resulting from converting said subtrie includes a plurality of entries corresponding to distinct lookup values.

21. A method as in claim 20, wherein said at least one additional node includes a plurality of said second type nodes.

22. A method including
 removing an old entry from a hybrid trie structure having at least a first type node and a second type node, wherein said first node includes one said entry and said second type node includes a plurality of said entries; and
 converting a subtrie of said hybrid trie structure into at least one said first type node in response to a number of entries dependent from a branch node in said hybrid trie structure, wherein said old entry was dependent from said branch node, wherein said branch node resulting from converting said subtrie including a plurality of entries corresponding to distinct lookup values, and wherein said hybrid trie includes at least a first type branch node and a second type branch node, said second type branch node having a plurality of entries corresponding to distinct lookup values associated therewith.

* * * * *

UNITED STATES PATENT AND TRADEMARK OFFICE
CERTIFICATE OF CORRECTION

PATENT NO. : 6,691,124 B2
DATED : February 10, 2004
INVENTOR(S) : Gupta et al.

It is certified that error appears in the above-identified patent and that said Letters Patent is hereby corrected as shown below:

Column 8,
Line 47, after the phrase "claim 4," insert -- wherein --.
Line 66, delete "leaf-branch node" and substitute therefor -- leaf-search node --.

Column 10,
Line 18, delete "one entry" and substitute therefor -- one said entry --.
Line 45, delete "first node" and substitute therefor -- first type node --.

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,691,124 B2
DATED : February 10, 2004
INVENTOR(S) : Pankaj Gupta et al.

It is certified that error appears in the above-identified patent and that said Letters Patent is hereby corrected as shown below:

Column 10,
Line 18, "one entry" (as deleted in Certificate of Correction issued August 17, 2004) should be reinstated.

Signed and Sealed this

Fifteenth Day of February, 2005

JON W. DUDAS
*Director of the United States Patent and Trademark Office*